United States Patent
Yen

(10) Patent No.: US 8,263,911 B2
(45) Date of Patent: Sep. 11, 2012

(54) ELECTRONIC DEVICE WITH HEATING PROTECTION CIRCUIT AND HEATING PROTECTION METHOD THEREOF

(75) Inventor: Hung-Wei Yen, Taipei (TW)

(73) Assignee: Pegatron Corporation, Beitou District, Taipei (TW)

( * ) Notice: Subject to any disclaimer, the term of this patent is extended or adjusted under 35 U.S.C. 154(b) by 282 days.

(21) Appl. No.: 12/779,921

(22) Filed: May 13, 2010

(65) Prior Publication Data

US 2010/0296218 A1 Nov. 25, 2010

(30) Foreign Application Priority Data

May 25, 2009 (TW) ................................ 98117273 A

(51) Int. Cl.
*H05B 3/02* (2006.01)
(52) U.S. Cl. ........ 219/481; 219/482; 219/483; 219/485; 219/490; 219/494; 219/497
(58) Field of Classification Search ................. 219/481, 219/482, 483, 485, 490, 494, 497
See application file for complete search history.

(56) References Cited

U.S. PATENT DOCUMENTS

| | | | | |
|---|---|---|---|---|
| 4,534,406 A * | 8/1985 | Newell et al. | .................. | 165/255 |
| 4,593,180 A * | 6/1986 | Narita et al. | .................. | 219/492 |
| 4,896,199 A | 1/1990 | Tsuzuki | | |
| 5,304,781 A * | 4/1994 | Stalsberg | ....................... | 219/501 |
| 5,350,900 A * | 9/1994 | Inage et al. | .................... | 219/508 |
| 5,932,127 A * | 8/1999 | Maddox | ........................ | 219/492 |
| 6,222,162 B1* | 4/2001 | Keane | ........................... | 219/481 |
| 6,355,912 B2* | 3/2002 | Allard | ............................ | 219/481 |
| 6,355,913 B1* | 3/2002 | Authier et al. | ................. | 219/481 |
| 6,439,678 B1* | 8/2002 | Norton | ............................... | 347/9 |
| 6,512,203 B2* | 1/2003 | Jones et al. | ..................... | 219/219 |
| 7,145,111 B2* | 12/2006 | Hori | ................................. | 219/497 |
| 7,350,891 B2* | 4/2008 | Oomura et al. | ..................... | 347/9 |
| 7,429,719 B1* | 9/2008 | Spetz | ............................. | 219/482 |
| 8,003,922 B2* | 8/2011 | Seger | ............................ | 219/502 |
| 8,097,835 B2* | 1/2012 | Hsieh | ............................. | 219/494 |
| 8,115,455 B2* | 2/2012 | Sellin et al. | .................... | 320/152 |
| 8,131,404 B2* | 3/2012 | Okada et al. | .................. | 700/299 |
| 2006/0028257 A1 | 2/2006 | Huang | | |
| 2011/0109297 A1* | 5/2011 | Tosuntikool | ................... | 323/350 |

FOREIGN PATENT DOCUMENTS

| | | |
|---|---|---|
| CN | 2600024 Y | 1/2004 |
| CN | 101098570 A | 1/2008 |

* cited by examiner

*Primary Examiner* — Viet Q Nguyen
(74) *Attorney, Agent, or Firm* — Winston Hsu; Scott Margo

(57) ABSTRACT

This invention discloses an electronic device with a heating protection circuit and a heating protection method thereof. The electronic device includes a control module, a heating protection circuit, a heating switch module, and a heating module. The control module provides a first control signal and a second control signal via a plurality of control pins, respectively. The heating protection circuit generates a third control signal according to the first control signal and the second control signal. The heating switch module controls the heating module whether to heat according to the third control signal.

14 Claims, 3 Drawing Sheets

ELECTRONIC DEVICE WITH HEATING PROTECTION CIRCUIT AND HEATING PROTECTION METHOD THEREOF

CROSS-REFERENCE TO RELATED APPLICATIONS

This Non-provisional application claims priority under 35 U.S.C. §119(a) on Patent Application No(s). 098117273 filed in Taiwan, Republic of China on May 25, 2009, the entire contents of which are hereby incorporated by reference.

BACKGROUND OF THE INVENTION

1. Field of the Invention

This invention relates to an electronic device and, more particularly, to an electronic device with a heating protection circuit and a heating protection method thereof.

2. Description of the Related Art

In recent years, with development of electronic science, different kinds of data processing devices with different functions and uses, such as personal computers, notebook computers, and industrial computers, are presented at the market. The industrial computers are widely applied to different kinds of fields.

Generally speaking, in response to different using environment, the industrial computers may have different corresponding specifications and functions. For example, if the industrial computer is used in a country at the higher latitude (such as a Northern European country), the temperature thereof at winter is lower and the temperature may be even lower than subzero ten degrees. Therefore, to allow the industrial computer to be normally operated under the lower temperature, the industrial computer needs to have a lower temperature booting specification and function. Once the operating temperature is lower than a certain predetermined value (such as subzero five degrees), a control element of the industrial computer can start a heating function to heat, thereby successfully booting up the computer.

However, since the present industrial computer with the lower temperature booting function can control switches of the control element responsible for heating only via firmware, once a heating signal has a malfunction (for example, the malfunction may be caused by errors of a firmware program) or a control voltage of the control element is abnormal, the control element may control a heater continually to heat to make a heating film or a heated element may be burnt down, such that the whole system fails to be operated successfully.

BRIEF SUMMARY OF THE INVENTION

This invention provides an electronic device, capable of using a heating protection circuit to prevent unconditional heating caused by a malfunction of a heating signal or abnormity of a power source of a control element from burning down a heating device or a heated element, and a method thereof to improve the prior art.

This invention provides an electronic device. The electronic device has a lower temperature booting function. The electronic device includes a control module, a heating protection circuit, a heating switch module, and a heating module. The control module provides a first control signal and a second control signal via a plurality of control pins. The heating protection circuit receives the first control signal and the second control signal from the control pins of the control module and generates a third control signal according to the first control signal and the second control signal. The heating switch module receives the third control signal from the heating protection circuit and controls the heating module whether to heat according to the third control signal.

This invention also provides a heating protection circuit. The heating protection circuit is applied to an electronic device with a lower temperature booting function. The electronic device includes a control module, a heating switch module, and a heating module. The control module provides a first control signal and a second control signal via a plurality of control pins. A heating protection unit of the heating protection circuit is coupled with the control module and the heating switch module, receives the first control signal and the second control signal from the control module, and generates a third control signal according to the first control signal and the second control signal. When the heating switch module receives the third control signal, the heating switch module controls the heating module whether to heat according to the third control signal.

This invention further provides a heating protection method of an electronic device. The electronic device includes a control module, a heating protection circuit, a heating module, and a heating switch module. The control module includes a plurality of control pins. The method includes the following steps. The control module is used to provide a first control signal and a second control signal via the control pins, respectively. The heating protection circuit is used to receive the first control signal and the second control signal from the control pins and to generate a third control signal according to the first control signal and the second control signal. The heating switch module is used to receive the third control signal and to control the heating module whether to heat according to the third control signal.

Compared with the prior art, according to the electronic device with the heating protection circuit and the method thereof in the invention, a control signal CTL generated by the control module can assist the heating protection circuit in correctly determining whether a heating signal is failed (for example, the failed state may be caused by errors of a firmware program) or whether a control voltage of a control element is abnormal, thus to automatically control the heating module to stop heating. Therefore, the problem that a heating film or a heated element may be burnt down caused by unconditional heating and failure of stopping heating in the prior art can be effectively avoided, such that the whole system can be successfully booted up and operated under a lower temperature.

These and other features, aspects, and advantages of the present invention will become better understood with regard to the following description, appended claims, and accompanying drawings.

DETAILED DESCRIPTION OF THE INVENTION

This invention provides an electronic device with a heating protection circuit and a method thereof. When a heating signal is failed (for example, the failed state may be caused by errors of a firmware program) or a control voltage of a control element is abnormal, the heating protection circuit of the electronic device provided by one preferred embodiment of the invention can automatically control a heating module to stop heating, thereby improving the prior art where a heating device or a heated element may be burnt down caused by unconditional heating of an electronic device with a lower temperature booting function.

Figure 1:
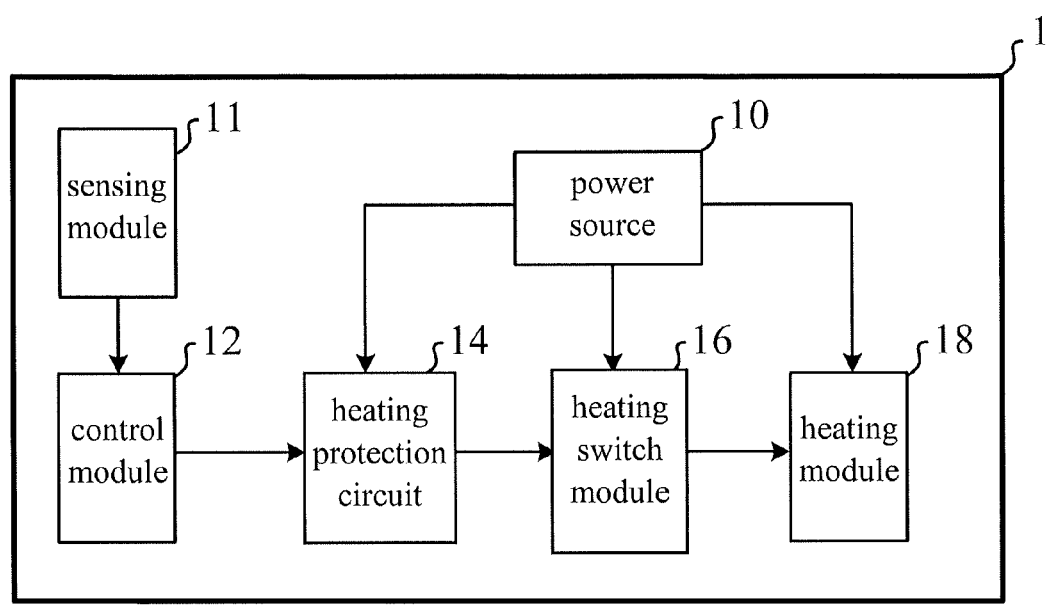
FIG. 1 is a functional block diagram showing an electronic device according to a first embodiment of the invention.
Figure 2:
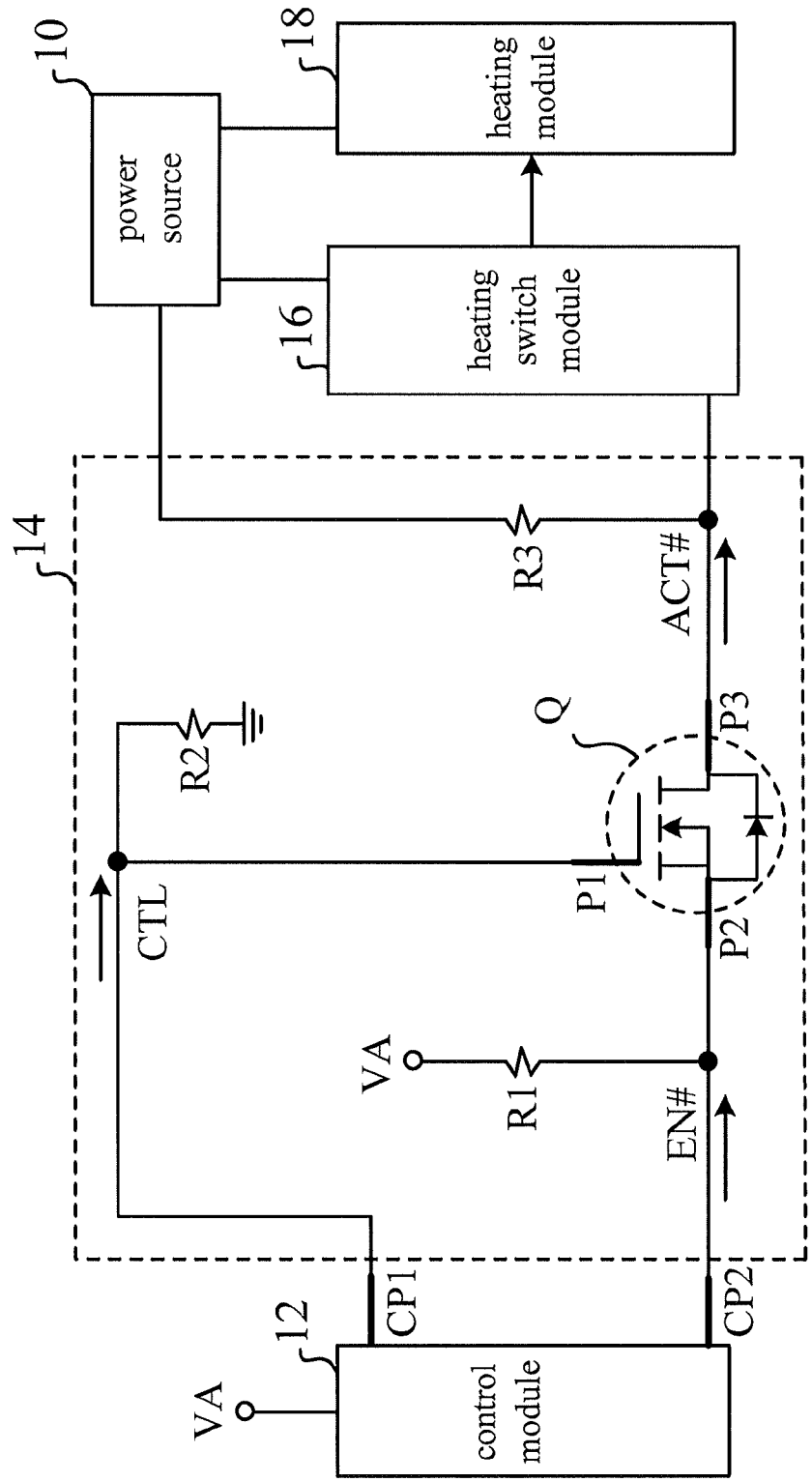
FIG. 2 is a detailed circuit diagram showing a heating protection circuit of the electronic device in FIG. 1.

According to a first embodiment of the invention, an electronic device is provided. The electronic device in this embodiment may be an industrial computer with a lower temperature booting specification and function. However, the invention is not limited thereto. FIG. 1 is a functional block diagram showing an electronic device 1 according to the embodiment. FIG. 2 is a detailed circuit diagram showing a heating protection circuit 14 of the electronic device 1 in FIG. 1.

Please refer to FIG. 1 and FIG. 2 together. The electronic device 1 includes a power source 10, a sensing module 11, a control module 12, a heating protection circuit 14, a heating switch module 16, and a heating module 18. The power source 10 is coupled with the heating protection circuit 14, the heating switch module 16, and the heating module 18, and it is used for providing power needed by operation of each module. The sensing module 11 is coupled with the control module 12. The control module 12 is coupled with the heating protection circuit 14. The heating protection circuit 14 is coupled with the heating switch module 16. The heating switch module 16 is coupled with the heating module 18.

In the embodiment, the sensing module 11 is used for sensing an environment temperature of the electronic device 1 to generate a sensing result. The sensing module 11 transmits the sensing result to the control module 12.

In the embodiment, the control module 12 includes a first control pin CP1 and a second control pin CP2. The first control pin CP1, such as a general purpose I/O (GPIO) pin, outputs a first control signal CTL generated by the control module 12. The second control pin CP2 outputs a second control signal EN# generated by the control module 12. However, the invention is not limited thereto.

In the embodiment, the first control pin CP1 and the second control pin CP2 of the control module 12 are not directly coupled with the heating switch module 16, while they are first coupled with the heating protection circuit 14, and then the heating protection circuit 14 is coupled with the heating switch module 16, thereby achieving a circuit protection effect.

When the control module 12 receives the sensing result, the control module 12 can first determine whether the temperature sensed by the sensing module 11 is lower than a predetermined value then to determine whether to heat or not. In the embodiment, the predetermined value can be set by a user. However, the invention is not limited thereto.

The heating protection circuit 14 can receive the first control signal CTL and the second control signal EN# from the first control pin CP1 and the second control pin CP2 of the control module 12, respectively. The heating protection circuit 14 generates a third control signal ACT# according to the first control signal CTL and the second control signal EN#. Actually, the control module 12 can determine whether the third control signal ACT# is a heating starting signal or a heating stopping signal according to whether the first control signal CTL and the second control signal EN# are in a second state (such as a high level) or a first state (such as a low level). Then, the heating protection circuit 14 is described in detail hereinbelow.

In the embodiment, the heating protection circuit 14 can include a metal-oxide-semiconductor field-effect transistor (MOSFET) Q, a first resistor R1, a second resistor R2, and a third resistor R3. A first pin P1 and a second pin P2 of the MOSFET Q are coupled with the control module 12, and the MOSFET Q receives the first control signal CTL and the second control signal EN# from the control module 12 via the first pin P1 and the second pin P2, respectively. A third pin P3 of the MOSFET Q is coupled with the heating switch module 16, and the MOSFET Q transmits the third control signal ACT# to the heating switch module 16 via the third pin P3.

The coupling relation of the first resistor R1, the second resistor R2, and the third resistor R3 is described. One terminal of the first resistor R1 is coupled between the control module 12 and the second pin P2 of the MOSFET Q, and the other terminal is coupled with a specific voltage VA, wherein the specific voltage VA can be provided by a control power source circuit of the control module 12, and the control power source circuit also provides the specific voltage VA to the control module 12. One terminal of the second resistor R2 is grounded, and the other terminal is coupled between the first pin P1 of the MOSFET Q and the control module 12. One terminal of the third resistor R3 is coupled with the power source 10, and the other terminal is coupled between the third pin P3 of the MOSFET Q and the heating switch module 16.

When the heating switch module 16 receives the third control signal from the heating protection circuit 14, the heating switch module 16 can selectively control the heating module 18 to heat according to the third control signal. If the third control signal is a heating starting signal, the heating switch module 16 controls the heating module 18 to heat. If the third control signal is a heating stopping signal, the heating switch module 16 controls the heating module 18 to stop heating.

The heating switch module 16 and the heating module 18 may also include transistors. However, the invention is not limited thereto. The heating module 18 may include a heating element or a heated element. When the heating switch module 16 controls the heating module 18 to heat, the heating module 18 heats the heated element via the heating element to achieve a heating-up effect, such that the electronic device 1 can be successfully booted up under a lower temperature.

The following operating embodiments are used to describe how the electronic device 1 in the embodiment of the invention uses the heating protection circuit 14 to avoid unconditional heating of the heating module 18.

(1) When certain circuit or element in the system fails, the specific voltage (control voltage) VA provided by the control power source of the control module 12 may be abnormal (such as VA=0). At that moment, the first control signal CTL and the second control signal EN# generated by the control module 12 are in the first state.

After the heating protection circuit 14 receives the first control signal CTL and the second control signal EN#, since the first pin P1 of the MOSFET Q of the heating protection circuit 14 (in the embodiment, the first pin P1 is coupled with a gate terminal of the MOSFET Q) will be pulled down to the first state by the second resistor R2, the MOSFET Q is in an off state. At that moment, the third control signal ACT# outputted from the MOSFET Q to the heating switch module 16 via the third pin P3 is a heating stopping signal, and the third control signal ACT# can be pulled up to a voltage state provided by the power source 10 by the third resistor R3, such that the heating switch module 16 is in an on state. Then, the heating switch module 16 can control the heating module 18 to stop heating according to the third control signal ACT# indicating stopping heating.

Thereby, even if the specific voltage (control voltage) VA provided by the control power source circuit of the control module 12 is abnormal, the electronic device 1 can still automatically control the heating module 18 to stop heating via the heating protection circuit 14, thus to avoid burning down the heating element or the heated element due to no circuit protection mechanism in the prior art.

(2) When a firmware program of the control module 12 has errors (for example, the firmware check sum is error), the second control signal EN# generated by the control module 12 may be in a second state or a first state, which may easily cause a malfunction. Besides generating the second control signal EN#, the control module 12 in the embodiment of the invention further generates the first control signal CTL to assist the heating protection circuit 14 in correctly determining whether to heat or not. When the firmware program has errors (for example, the firmware check sum is abnormal), the first control signal CTL is in the first state. Only when the firmware check sum is normal, the first control signal CTL can be pulled up to the second state.

Then, the conditions that the second control signal EN# is in the second state or in the first state are described hereinbelow. If the second control signal EN# is in the second state, the heating module 18 will stop heating. Therefore, the problem that the heating element or the heated element may be burnt down due to unconditional heating in the prior art can be avoided. If the second control signal EN# is in the first state, after the heating protection circuit 14 receives the first control signal CTL and the second control signal EN#, since the first pin P1 of the MOSFET Q of the heating protection circuit 14 (the first pin P1 is coupled with a gate terminal of the MOSFET Q) can be pulled down to the first state by the second resistor R2, the MOSFET Q is in the off state.

At that moment, the third control signal ACT# outputted from the MOSFET Q to the heating switch module 16 via the third pin P3 is a heating stopping signal, and the third control signal ACT# can be pulled up to the voltage state provided by the power source 10 by the third resistor R3, such that the heating switch module 16 is in the on state. Then, the heating switch module 16 controls the heating module 18 to stop heating according to the third control signal ACT# indicating stopping heating. Thereby, even if the firmware program of the control module 12 has errors, the electronic device 1 can still automatically control the heating module 18 to stop heating according to correct determination of the heating protection circuit 14, thereby achieving the circuit protection effect.

(3) When the firmware program of the control module 12 is normal (for example, the firmware check sum is correct), the control module 12 can pull up the first control signal CTL to the second state. When the control module 12 determines that the temperature sensed by the sensing module 11 is lower than a predetermined value and determines to heat, the control module 12 can pull down the second control signal EN# to the first state. At that moment, the MOSFET Q is in the on state, and the third control signal ACT# outputted from the MOSFET Q to the heating switch module 16 via the third pin P3 is a heating starting signal. Further, the third control signal ACT# is in the first state, such that the heating switch module 16 is in the off state. At that moment, the heating switch module 16 can control the heating module 18 to heat according to the third control signal ACT# indicating starting heating.

On the other hand, when the control module 12 determines that the temperature sensed by the sensing module 11 is greater than the predetermined value and determines to stop heating, the control module 12 can pull up the second control signal EN# to the second state. At that moment, the MOSFET Q is in the off state, and the third control signal ACT# outputted from the MOSFET Q to the heating switch module 16 via the third pin P3 is a heating stopping signal. Further, the third control signal ACT# is in the second state, such that the heating switch module 16 is in the on state. Therefore, the heating switch module 16 can control the heating module 18 to stop heating according to the third control signal ACT# indicating stopping heating.

According to a second embodiment of the invention, a heating protection circuit is provided. The heating protection circuit is applied to an electronic device with a lower temperature booting function. The electronic device includes a power source, a control module, a heating switch module, and a heating module. The control module provides a first control signal and a second control signal via a plurality of control pins, respectively. The detailed circuit is shown in FIG. 2. Therefore, it is not described herein for a concise purpose.

In the embodiment, the heating protection circuit includes a heating protection unit, a first resistor, a second resistor, and a third resistor. The heating protection unit is coupled with the control module and the heating switch module, and it is used for receiving the first control signal and the second control signal from the control module and for generating a third control signal according to the first control signal and the second control signal thus to transmit the third control signal to the heating switch module. The heating protection unit may be a MOSFET, a first pin and a second pin of the MOSFET are coupled with the control module and receive the first control signal and the second control signal from the control module, respectively, and a third pin of the MOSFET is coupled with the heating switch module and outputs the third control signal to the heating switch module.

One terminal of the first resistor is coupled between the control module and the heating protection unit, and the other terminal is coupled with a specific voltage (or called control voltage). The specific voltage may be provided by a control power source circuit of the control module. When circuit or elements of the electronic device is failed, the specific voltage may be reduced to zero. One terminal of the second resistor is grounded, and the other terminal is coupled between the heating protection unit and the control module. One terminal of the third resistor is coupled with the power source, and the other terminal is coupled between the heating protection unit and the heating switch module.

When the first control signal is in a first state and the second control signal is in a first state, the heating protection unit is in an off state and the third control signal is a heating stopping signal, such that the heating switch module controls the heating module to stop heating according to the third control signal. The specific voltage is zero or the program of the control module is abnormal, and therefore the first control signal may be in the first state and the second control signal may be in the first state. However, the invention is not limited thereto.

When the first control signal is in the second state and the second control signal is in the first state, the heating protection unit is in an on state and the third control signal is a heating starting signal, such that the heating switch module controls the heating module to heat according to the third control signal. When the first control signal is in the second state and the second control signal is in the second state, the heating protection unit is in the off state and the third control signal is a heating stopping signal, such that the heating switch module controls the heating module to stop heating according to the third control signal.

According to a third embodiment of the invention, a heating protection method of an electronic device is provided. In the embodiment, the electronic device includes a control module, a heating protection circuit, a heating module, and a heating switch module. The control module has a first control pin and a second control pin. The heating protection circuit may include a heating protection unit, a first resistor, a second resistor, and a third resistor. The heating protection unit may be a MOSFET. However, the invention is not limited thereto.

Figure 3:
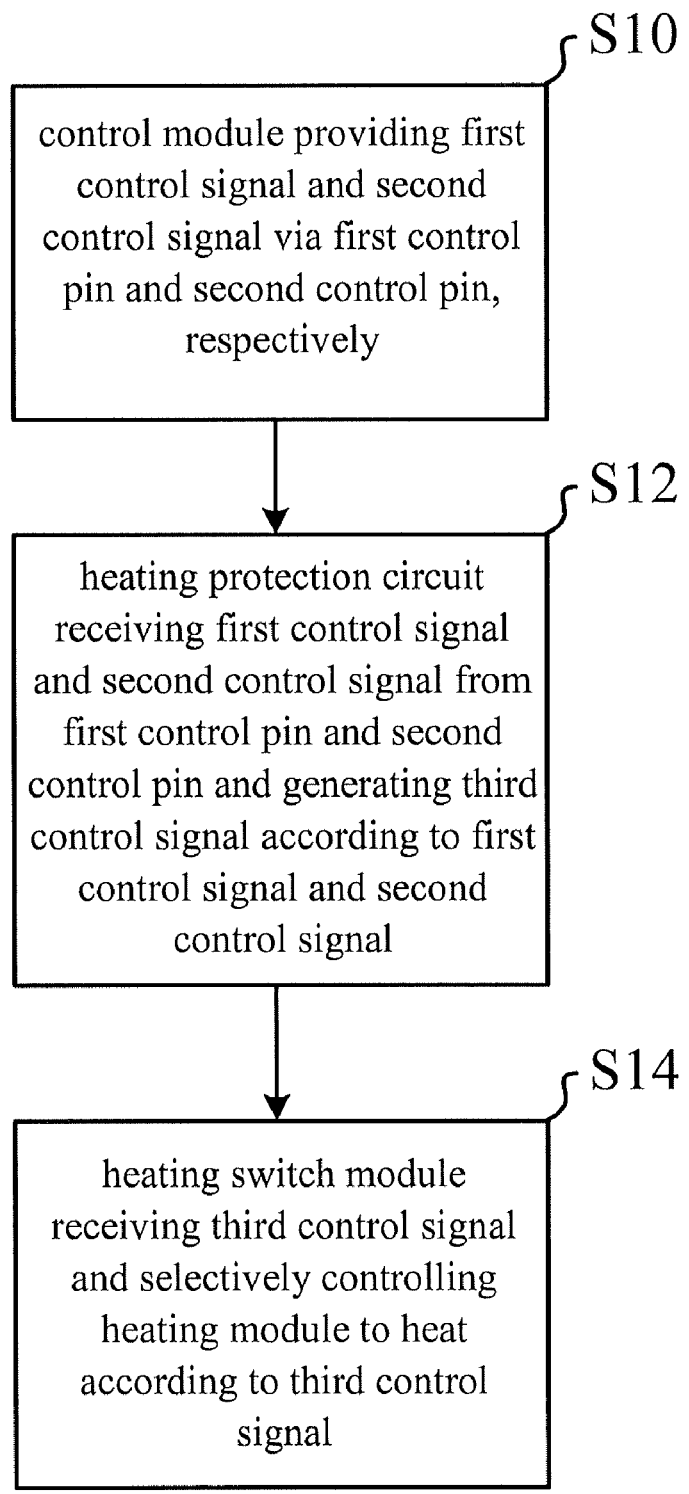
FIG. 3 is a flowchart showing a heating protection method of an electronic device according to one preferred embodiment of the invention.

FIG. 3 is a flowchart showing a heating protection method for operating the electronic device. In FIG. 3, in step S10, the control module provides a first control signal and a second control signal via the first control pin and the second control pin, respectively. In step S12, the heating protection circuit receives the first control signal and the second control signal from the first control pin and the second control pin and generates a third control signal according to the first control signal and the second control signal. In step S14, the heating switch module receives the third control signal and controls the heating module whether to heat according to the third control signal.

When the first control signal is in a first state and the second control signal is in a first state, it indicates that a heating signal may be failed (for example, the failed state may be caused by errors of a firmware program) or a control voltage of a control element may be abnormal. Thus, the electronic device is controlled to stop heating according to the above method. When the first control signal is in a second state and the second control signal is in a first state, it indicates that the firmware check sum is correct and heating is needed. Thus, the electronic device is controlled to heat according to the above method. When the first control signal is in a second state and the second control signal is in a second state, the firmware check sum is correct and the heating is not needed. Thus, the electronic device is controlled to stop heating according to the above method.

Compared with the prior art, according to the electronic device with the heating protection circuit and the method thereof in the preferred embodiments of the invention, a control signal CTL generated by the control module can assist the heating protection circuit in correctly determining whether a heating signal is failed (for example, the failed state may be caused by errors of a firmware program) or whether a control voltage of a control element is abnormal thus to automatically control the heating module to stop heating. Therefore, the problem that a heating film or a heated element may be burnt down caused by unconditional heating and failure of stopping heating in the prior art can be effectively avoided, such that the whole system can be successfully booted up and operated under a lower temperature.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed:

1. An electronic device comprising:
a control module having a plurality of control pins, the control module providing
a first control signal and a second control signal via the control pins, respectively;
a heating protection circuit coupled with the control pins of the control module for receiving the first control signal and the second control signal, the heating protection circuit generating a third control signal according to the first control signal and the second control signal;
a heating module; and
a heating switch module coupled with the heating protection circuit and the heating module, the heating switch module receiving the third control signal and controlling the heating module whether to heat according to the third control signal;
wherein the heating protection circuit includes a heating protection unit coupled with the control module and the heating switch module, and the heating protection unit receives the first control signal and the second control signal from the control module and generates the third control signal according to the first control signal and the second control signal thus to transmit the third control signal to the heating switch module;
wherein the heating protection unit is a metal-oxide-semiconductor field-effect transistor (MOSFET) and has a first pin, a second pin, and a third pin, the first pin and the second pin are coupled with the control module, the third pin is coupled with the heating switch module, the heating protection unit receives the first control signal and the second control signal from the control module via the first pin and the second pin, respectively, and the heating protection unit transmits the third control signal to the heating switch module via the third pin.

2. The electronic device according to claim 1, wherein when the first control signal is in a first state and the second control signal is in the first state, the heating protection unit is in an off state and the third control signal generated by the heating protection unit is a heating stopping signal, such that the heating switch module controls the heating module to stop heating according to the third control signal.

3. The electronic device according to claim 2, wherein when a control voltage of the control module is abnormal, the first control signal is in the first state and the second control signal is in the first state.

4. The electronic device according to claim 1, wherein when the first control signal is in a second state and the second control signal is in a first state, the heating protection unit is in an on state and the third control signal generated by the heating protection unit is a heating starting signal, such that the heating switch module controls the heating module to heat according to the third control signal.

5. The electronic device according to claim 1, wherein when the first control signal is in a second state and the second control signal is in the second state, the heating protection unit is in an off state and the third control signal generated by the heating protection unit is a heating stopping signal, such that the heating switch module controls the heating module to stop heating according to the third control signal.

6. A heating protection circuit applied to an electronic device, the electronic device including a control module, a heating switch module, and a heating module, the control module providing a first control signal and a second control signal via a plurality of control pins, respectively, the heating protection circuit comprising:
a heating protection unit coupled with the control module and the heating switch module, receiving the first control signal and the second control signal from the control module, and generating a third control signal according to the first control signal and the second control signal thus to transmit the third control signal to the heating switch module;
wherein when the heating switch module receives the third control signal, the heating switch module controls the heating module whether to heat according to the third control signal;
wherein the heating protection unit is a MOSFET and has a first pin, a second pin, and a third pin, the first pin and the second pin are coupled with the control module, the third pin is coupled with the heating switch module, the heating protection unit receives the first control signal and the second control signal from the control module via the first pin and the second pin, respectively, and the heating protection unit transmits the third control signal to the heating switch module via the third pin.

7. The heating protection circuit according to claim 6, wherein when the first control signal is in a first state and the second control signal is in the first state, the heating protection unit is in an off state and the third control signal generated by the heating protection unit is a heating stopping signal, such that the heating switch module controls the heating module to stop heating according to the third control signal.

8. The heating protection circuit according to claim 7, wherein when a control voltage of the control module is abnormal, the first control signal is in the first state and the second control signal is in the first state.

9. The heating protection circuit according to claim 6, wherein when the first control signal is in a second state and the second control signal is in a first state, the heating protection unit is in an on state and the third control signal generated by the heating protection unit is a heating starting signal, such that the heating switch module controls the heating module to heat according to the third control signal.

10. The heating protection circuit according to claim 6, wherein when the first control signal is in a second state and the second control signal is in the second state, the heating protection unit is in an off state and the third control signal generated by the heating protection unit is a heating stopping signal, such that the heating switch module controls the heating module to stop heating according to the third control signal.

11. A heating protection method of an electronic device, the electronic device including a control module, a heating protection circuit, a heating module, and a heating switch module, the control module having a plurality of control pins, the method comprising the following steps of:

using the control module to provide a first control signal and a second control signal via the control pins, respectively;

using the heating protection circuit to receive the first control signal and the second control signal from the control pins and to generate a third control signal according to the first control signal and the second control signal; and using the heating switch module to receive the third control signal and to control the heating module whether to heat according to the third control signal;

wherein the heating protection circuit includes a heating protection unit and a plurality of resistors, the heating protection unit is a MOSFET, the heating protection unit receives the first control signal and the second control signal from the control module and generates the third control signal according to the first control signal and the second control signal thus to transmit the third control signal to the heating switch module.

12. The heating protection method according to claim 11, wherein when the first control signal is in a first state and the second control signal is in the first state, the heating protection unit is in an off state and the third control signal generated by the heating protection unit is a heating stopping signal, such that the heating switch module controls the heating module to stop heating according to the third control signal.

13. The heating protection method according to claim 11, wherein when the first control signal is in a second state and the second control signal is in a first state, the heating protection unit is in an on state and the third control signal generated by the heating protection unit is a heating starting signal, such that the heating switch module controls the heating module to heat according to the third control signal.

14. The heating protection method according to claim 11, wherein when the first control signal is in a second state and the second control signal is in the second state, the heating protection unit is in an off state and the third control signal generated by the heating protection unit is a heating stopping signal, such that the heating switch module controls the heating module to stop heating according to the third control signal.

\* \* \* \* \*